United States Patent
Szor

(10) Patent No.: US 7,779,473 B1
(45) Date of Patent: **\*Aug. 17, 2010**

(54) DYNAMIC DETECTION OF COMPUTER WORMS

(75) Inventor: Peter Szor, Northridge, CA (US)

(73) Assignee: Symantec Corporation, Mountain View, CA (US)

( * ) Notice: Subject to any disclaimer, the term of this patent is extended or adjusted under 35 U.S.C. 154(b) by 374 days.

This patent is subject to a terminal disclaimer.

(21) Appl. No.: 11/865,039

(22) Filed: Sep. 30, 2007

Related U.S. Application Data

(63) Continuation of application No. 10/360,381, filed on Feb. 6, 2003, now Pat. No. 7,293,290.

(51) Int. Cl.
 *G06F 11/00* (2006.01)
(52) U.S. Cl. .......................... 726/24; 713/188
(58) Field of Classification Search .................. 726/24; 713/188
 See application file for complete search history.

(56) References Cited

U.S. PATENT DOCUMENTS

| | | | | |
|---|---|---|---|---|
| 5,623,600 A | * | 4/1997 | Ji et al. | 726/24 |
| 6,981,279 B1 | * | 12/2005 | Arnold et al. | 726/22 |
| 7,093,239 B1 | * | 8/2006 | van der Made | 717/135 |
| 7,334,262 B2 | * | 2/2008 | Szor | 726/22 |
| 7,389,540 B2 | * | 6/2008 | Radatti et al. | 726/24 |
| 2003/0212906 A1 | * | 11/2003 | Arnold et al. | 713/201 |
| 2004/0015719 A1 | * | 1/2004 | Lee et al. | 713/201 |
| 2004/0015726 A1 | * | 1/2004 | Szor | 713/201 |
| 2004/0019832 A1 | * | 1/2004 | Arnold et al. | 714/38 |

\* cited by examiner

*Primary Examiner*—Michael Pyzocha
(74) *Attorney, Agent, or Firm*—Fenwick & West LLP

(57) ABSTRACT

Methods, apparatuses, and computer-readable media for detecting malicious computer code in a host computer (1). A method embodiment of the present invention comprises the steps of determining (32) whether data leaving the host computer (1) is addressed to exit a port (15) of the host computer (1) where outbound executable content normally does not appear; when the data is addressed to exit such a port (15), determining (33) whether a string (24) from a pre-established runtime database (9) of executable threads is present in said data; and when a string (24) from said runtime database (9) is present in said data, declaring (34) a suspicion of presence of malicious computer code in said data.

20 Claims, 3 Drawing Sheets

DYNAMIC DETECTION OF COMPUTER WORMS

CROSS REFERENCE TO RELATED APPLICATIONS

This application is a continuation of U.S. application Ser. No. 10/360,381, filed Feb. 6, 2003 now U.S. Pat. No. 7,293,290, which is incorporated by reference in its entirety.

BACKGROUND

This invention pertains to the field of preventing malicious attacks to computers, and, in particular, attacks by computer worms.

As used herein, "malicious computer code" is any set of computer instructions that enters a computer without an authorized user's knowledge and/or without an authorized user's consent. Malicious computer code that propagates from one computer to another over a network, e.g., the Internet, is often referred to as a "worm."

Network based intrusion detection systems have been constructed that examine inbound and outbound network packets that are entering and leaving a host computer. Such systems scan the contents of these packets to look for strings containing known malicious code. Some of these systems are capable of reconstructing a stream of data out of the packet fragments. However, the string data that is representative of malicious code is historical string data. The present invention goes beyond such systems in providing string data that is generated on a real time (runtime) basis, thus providing a truly dynamic malicious code detection system. This invention also is capable of filtering outgoing traffic on the packet level as well as on the stream level.

SUMMARY

Methods, apparatuses, and computer-readable media for detecting malicious computer code in a host computer (1). A method embodiment of the present invention comprises the steps of determining (32) whether data leaving the host computer (1) is addressed to exit a port (15) of the host computer (1) where outbound executable content normally does not appear; when the data is addressed to exit such a port (15), determining (33) whether a string (24) from a pre-established runtime database (9) of executable threads is present in said data; and when a string (24) from said runtime database (9) is present in said data, declaring (34) a suspicion of presence of malicious computer code in said data.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION

Figure 1:
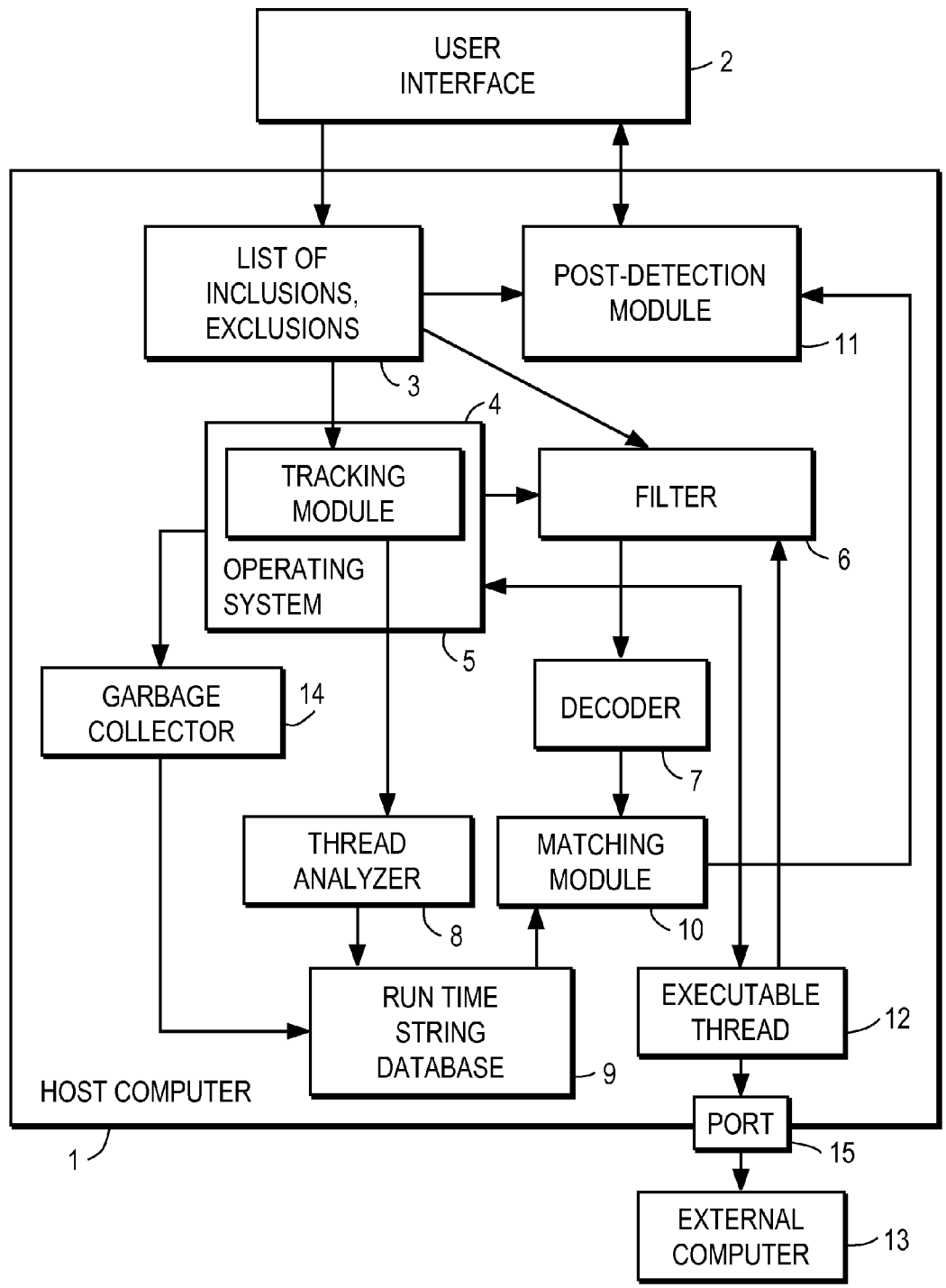
FIG. 1 is a block diagram of a system for implementing the present invention.

FIG. 1 illustrates an architecture that is suitable for implementing the present invention. The various modules illustrated in FIG. 1 can be implemented in any combination of hardware, firmware, and/or software. Most of the modules are typically implemented in software. The software modules can be resident on any computer-readable medium, e.g., hard disk, floppy disk, CD, DVD, or other media now known or later developed.

Filter 6 is a module adapted to analyze data that is addressed to exit host computer 1. Data leaving computer 1 may adhere to Internet protocols such as TCP/IP, and therefore be packetized, or the data may be stream data. Packet filtering by itself could lead to potential misses of infections, because of packet fragmentation. By also filtering application level stream data, packet fragmentation does not need to be handled by rebuilding individual packets.

Filter 6 is designed such that data addressed to exit computer 1 via ports 15 where outbound executable content normally does not appear is selected for further analysis. An example of such a port 15 is port 80 in HTTP (HyperText Transfer Protocol), the standard port used to access the World Wide Web.

The reason for selecting data addressed via such ports is that executable content sent via such a port gives rise to a suspicion that a computer worm is present. Port 25, the e-mail port, is not suitable for this purpose, because it would yield too many false positives. This is because it is rather common for legitimate e-mail to contain executable attachments.

Figure 2:
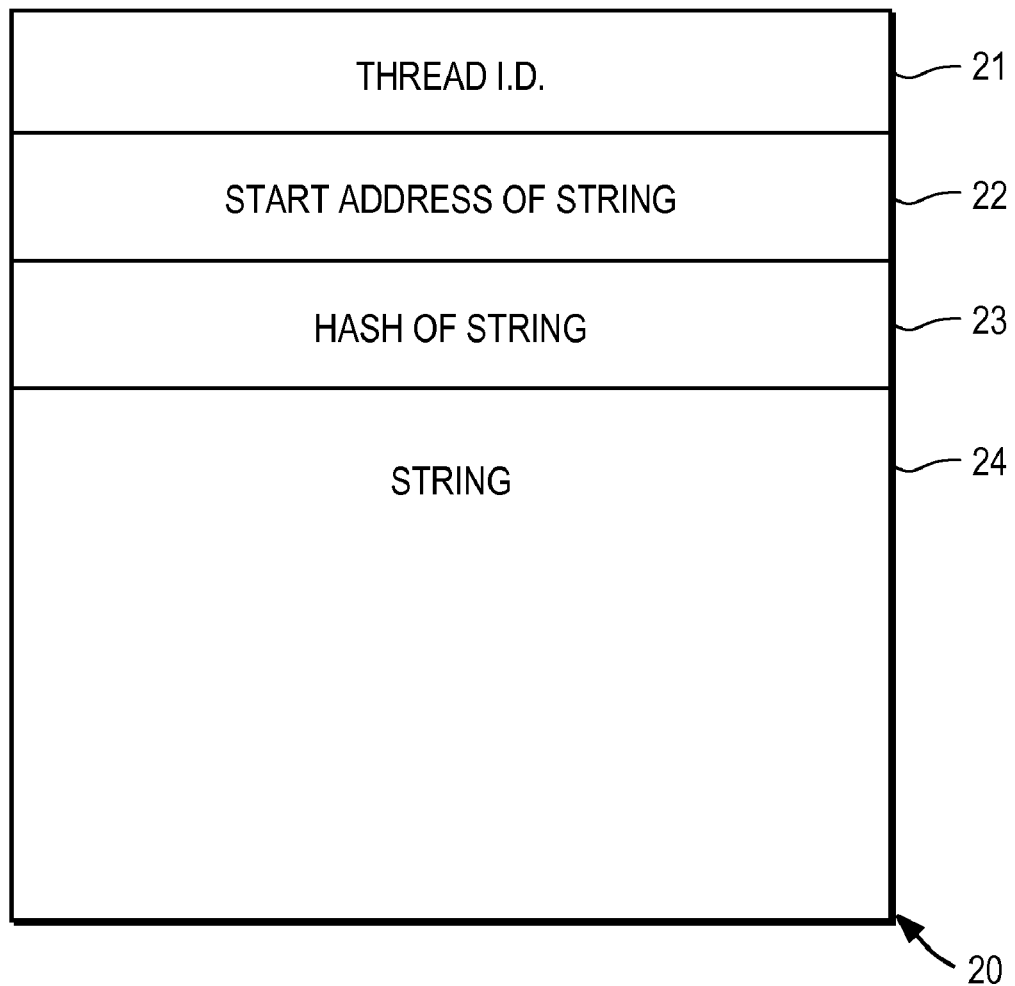
FIG. 2 is a data structure for a record 20 within runtime string database 9 of the present invention.

Runtime string database 9 contains a plurality of records 20 comprising strings 24 from threads 12 that have executed on computer 1 (see FIG. 2). For purposes of illustrating the present invention, it is assumed that the operating system (OS)5 running on computer 1 is a multi-threading (multi-tasking) OS. For example, OS 5 may be a Windows NT operating system manufactured by Microsoft Corporation of Redmond, Wash. Tracking module 4, which may be part of OS 5, is a software driver that hooks to the functionality of OS 5 and identifies threads 12. Examples of suitable drivers that can be used as tracking module 4 include tracker.sys; a driver that can provide system level hooking facility for intercepting function calls such as ZwCreateThread() in order to track the creation of new threads on the system; and filter.sys, which filters outbound network traffic.

Tracking module 4 typically tracks each thread 12 being executed on computer 1, unless list 3 instructs module 4 otherwise. List 3 is a storage area associated with host computer 1 that lists inclusions and exclusions that have been preselected by the system administrator or other human user of computer 1. Examples of items that may be included in the list of inclusions are specific ports 15 that should be observed by filter 6 and specific processes that should be analyzed by tracking module 4. An example of a process that could be specifically selected for tracking is inetinfo.exe, the Microsoft Internet Web service. The list 3 of inclusions may contain group lists, e.g., all network services, all processes, etc.

List 3 may also contain names of processes that do not have to be analyzed, because they are assumed to be free of malicious computer code. An example of such a process that could be automatically excluded is calc.exe. Another example is notepad.exe (unless a CreateRemoteThread() was used to create a thread inside that process). Having such a list of exclusions advantageously reduces overhead on host computer 1.

Thread analyzer 8 is a module coupled to tracking module 4 that analyzes the approved threads 12 and extracts relevant information therefrom, storing said information as a record 20 within runtime database 9. As used through this patent application, "coupled" means any type of coupling or connection, whether direct or indirect (i.e., via an intermediate module or device). FIG. 2 illustrates a typical format for such a record 20. Field 21 contains an identification of the thread 12. Field 24 contains a representative string from the thread 12. The string 24 usually has a preselected fixed length that is long enough to uniquely identify that particular thread 12. Field 22 contains a start address of the string 24, which may be the start address of the thread 12 containing the string 24. Alternative to the start address of the thread 12, field 22 may contain the start address of a point in the thread 12 following a jump instruction. The reason for looking at such a portion of a thread 12 is that malicious computer code often starts with a jump instruction. Optional field 23 contains a hash of string 24 calculated using a preselected hash function such as SHA-1 or MD5. The hash may be a hash of the entire string 24 or a hash of just a preselected portion of string 24, such as the beginning portion. Field 23 can be used to save time in the matching process, as will be described below.

Records 20 should not be duplicated within database 9. Thus, for example, thread analyzer 8 does not need to store a record 20 containing a hash 23 when said hash 23 already appears within database 9.

Figure 3:
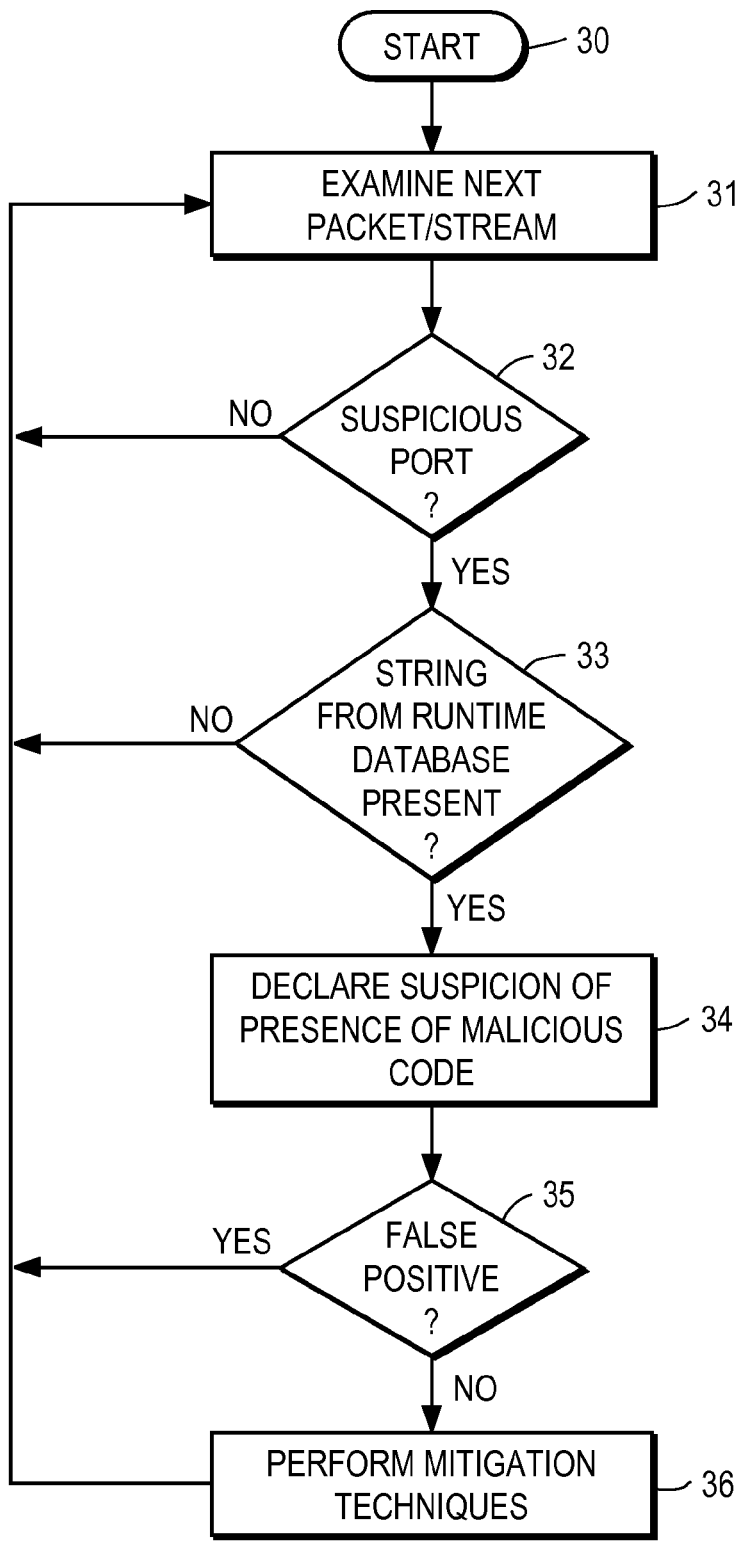
FIG. 3 is a flow diagram illustrating a method embodiment of the present invention.

Matching module 10 is coupled to filter 6 and to database 9. Module 10 is configured to determine whether a string from database 9 is present in outgoing data which has been filtered by filter 6 to include just data that is addressed to exit via ports 15 where outbound executable content is not normally present. The presence of such a string within an outgoing packet/stream gives rise to a suspicion that malicious computer code is present within the packet/stream. The packet/stream may be addressed to a computer 13 external to host computer 1. When a suspicion of malicious code is unearthed, control is passed to post-detection module 11 for implementing steps 34, 35, and 36, as illustrated in FIG. 3.

The outgoing data may be encoded by an encoding algorithm such as MIME (Multipurpose Internet Mail Extension) or UUencode. For this reason, a decoder 7 may be placed between filter 6 and matching module 10. Decoder 7 may be programmed to decode all data automatically, so as to make sure that encoded network traffic is decoded. Alternatively, decoder 7 may be programmed to search for encoded data by means of some algorithm, e.g., one that looks for a key word such as "MIME" in a header.

A garbage collector module 14 may be advantageously utilized to periodically purge runtime database 9 of extraneous information. In a first embodiment, module 14 is programmed to remove entries 20 corresponding to threads 12 upon the instructions of OS 5. OS 5 in turn may have received these instructions from an update to list 3. Module 14 may be instructed by OS 5 to execute periodically, e.g., once a day. In a second embodiment, module 14 is programmed to purge a record 20 when the corresponding thread 12 has not been executed for a preselected period of time. In a third embodiment, module 14 is programmed to purge records 20 when runtime database 9 exceeds a preselected size. This embodiment may be implemented without a separate module 14. For example, database 9 can be a fixed size storage area configured as a stack. When the stack gets full, a new record 20 fed into database 9 results in the oldest record 20 being discarded.

User interface module 2 provides a means by which the system administrator or other human user of computer 1 can communicate with the aforesaid modules. Tasks that can be performed by user interface 2 include:

The user can be alerted to the suspicion of malicious computer code by post-detection module 11.

The user can add to the list 3 of inclusions and exclusions.

The user can instruct post-detection module 11 as to what to do in case of a suspicion of malicious computer code. For example, there can be two modes, a log mode and a block mode. "Log" means that the suspicious activity is logged with being blocked. "Block" means that it is also blocked.

A method embodiment for carrying out the present invention will now be described in conjunction with FIG. 3. The method starts at step 30. At step 31, the next outgoing packet/stream is selected. (The first time the method is executed, the "next" outgoing packet/stream is the first.) At step 32, filter 6 determines whether the data contains an address 13 that will cause the data to exit a port 15 where outbound executable content is not normally present. If port 15 is not deemed to be suspicious according to this criterion, the method reverts to step 31. If port 15 is deemed to be suspicious, the method proceeds to step 33, where matching module 10 determines whether a string 24 from database 9 is present within the outgoing data. The matching can be performed by any conventional comparison algorithm. For example, the algorithm can compare each string 24 in database 9 with contents of the outgoing data. The algorithm can be expedited if all strings 24 have a predetermined fixed string length and a predetermined start point. As mentioned previously, the start point can be either the start address of the thread 12 containing the string, or an address following a jump instruction. The comparison can be further expedited by using hash 23. In this embodiment, hashes of strings within outgoing data are calculated, using the same hash algorithm that was used to calculate the hashes 23 in database 9. If and only if a hash 23 from database 9 matches a hash of a string within the outgoing data, the full strings are compared. If a string 24 from database 9 matches a string in the outgoing data, the method proceeds to step 34; otherwise, it reverts to step 31.

At step 34, post-detection module 11 typically sends a message to user interface 2 declaring a suspicion of presence of malicious computer code. Module 11 may also check for false positives and/or perform false positive mitigation steps at step 35. If malicious code is still suspected after the false positive procedures have been performed, the method proceeds to step 36; otherwise, it reverts to step 31. Examples of false positive procedures that can be performed at step 35 include the following:

The packet/stream is subjected to further analysis, e.g., it is scanned by an antivirus module or is optionally sent (with the approval of the system administrator) to the headquarters of an antivirus software company such as Symantec Corporation of Cupertino, Calif.

The packet/stream and/or corresponding string 24 and/or corresponding thread 12 and/or corresponding process are checked for the presence of a digital signature, and the digital signature is validated as having emanated from a trusted party.

The string is from a process 12 such as calc.exe that has been pre-cleared as a process that can be safely sent out via exit port 15. This pre-clearance information may be contained in list 3.

At step 36, malicious code mitigation procedures are performed. Such procedures may include:

Deleting from computer 1 the process containing the thread 12 represented by the string 24 that was found in the packet/stream.

Quarantining the packet/stream, the string 24, the thread 12, and/or the process.

Repairing the malicious code.

Preventing the packet/stream, the string 24, the thread 12, and/or the process from leaving computer 1.

The method then reverts to step 31.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A computer program product for detecting malicious computer code in a host computer, the computer program product comprising a non-transitory computer-readable storage medium containing executable computer program code for performing a method comprising:
   identifying a plurality of threads executed on the host computer;
   tracking the identified threads in a runtime database;
   analyzing data addressed to exit the host computer via a port of the host computer, wherein executable content does not normally exit the host computer via the port;
   determining whether the data addressed to exit the host computer via the port contain outbound executable content;
   when outbound executable content is addressed to exit the identified port, determining whether the outbound executable content matches an identified thread in the runtime database; and
   declaring a suspicion of malicious computer code in the outbound executable content if the outbound executable content matches an identified thread in the runtime database.

2. The computer program product of claim 1, wherein the identified port comprises an HTTP Internet port.

3. The computer program product of claim 1, wherein the identified port comprises port 80.

4. The computer program product of claim 1, wherein tracking the identified threads in a runtime database comprises storing a hash of at least a portion of the identified thread in the runtime database.

5. The computer program product of claim 1, wherein tracking the identified threads in a runtime database comprises storing a string of at least a portion of the identified thread and a hash of the string in the runtime database.

6. The computer program product of claim 5, wherein determining whether the outbound executable content matches an identified thread in the runtime database comprises:
   computing a hash of at least a portion of the outbound executable content;
   determining whether the computed hash of the outbound executable content matches a hash stored in the runtime database; and
   when the computed hash matches a stored hash, determining whether a string in the outbound executable content matches a string stored in the runtime database.

7. The computer program product of claim 1, wherein tracking the identified threads in a runtime database comprises:
   checking a listing of exclusions; and
   excluding from tracking any identified threads that are on the list of exclusions.

8. The computer program product of claim 1, wherein tracking the identified threads in a runtime database comprises:
   computing hashes of a plurality of threads executed on the host computer; and
   storing a record in the runtime database for each identified thread, the record comprising a computed hash and a corresponding string from the identified thread.

9. The computer program product of claim 8, wherein each record further comprises a start address of the string.

10. The computer program product of claim 9, wherein each record further comprises a start address of the identified thread.

11. The computer program product of claim 9, wherein each record further comprises a start address following a jump instruction within the identified thread.

12. The computer program product of claim 1, the medium further containing computer program code for performing the step:
   responsive to the suspicion of malicious computer code, preventing the data addressed to exit the host computer via the port from leaving the host computer.

13. The computer program product of claim 1, the medium further containing computer program code for performing the step:
   responsive to the suspicion of malicious computer code, deleting a process containing the identified thread in the runtime database matching the outbound executable content in the data addressed to exit the host computer via the port.

14. The computer program product of claim 1, the medium further containing computer program code for performing the step:
   responsive to the suspicion of malicious computer code, performing a false positive mitigation procedure to check the data containing the outbound executable content for the presence of a digital signature from a trusted party.

15. The computer program product of claim 1, the medium further containing computer program code for performing the step:
   responsive to the suspicion of malicious computer code, performing a false positive mitigation procedure to allow a process from a list of pre-approved processes to access the port.

16. A method of detecting malicious computer code in a host computer, comprising:
   identifying a plurality of threads executed on the host computer;
   tracking the identified threads in a runtime database;
   analyzing data addressed to exit the host computer via a port of the host computer, wherein executable content does not normally exit the host computer via the port;
   determining whether the data addressed to exit the host computer via the port contain outbound executable content;
   when outbound executable content is addressed to exit the identified port, determining whether the outbound executable content matches an identified thread in the runtime database; and
   declaring a suspicion of malicious computer code in the outbound executable content if the outbound executable content matches an identified thread in the runtime database.

17. The method of claim 16, wherein tracking the identified threads in a runtime database comprises storing a string of at least a portion of the identified thread and a hash of the string in the runtime database.

18. The method of claim 17, wherein determining whether the outbound executable content matches an identified thread in the runtime database comprises:

computing a hash of at least a portion of the outbound executable content;

determining whether the computed hash of the outbound executable content matches a hash stored in the runtime database; and when the computed hash matches a stored hash, determining whether a string in the outbound executable content matches a string stored in the runtime database.

19. A computer for detecting malicious computer code in the computer, comprising:

a non-transitory computer-readable storage medium containing executable computer program code for performing a method comprising:

identifying a plurality of threads executed on the computer;

tracking the identified threads in a runtime database;

analyzing data addressed to exit the computer via a port of the computer, wherein executable content does not normally exit the computer via the port;

determining whether the data addressed to exit the computer via the port contain outbound executable content;

when outbound executable content is addressed to exit the identified port, determining whether the outbound executable content matches an identified thread in the runtime database; and declaring a suspicion of malicious computer code in the outbound executable content if the outbound executable content matches an identified thread in the runtime database.

20. The computer of claim 19, wherein tracking the identified threads in a runtime database comprises storing a string of at least a portion of the identified thread and a hash of the string in the runtime database.

* * * * *